(12) United States Patent
Boudjatit

(10) Patent No.: US 12,504,554 B2
(45) Date of Patent: Dec. 23, 2025

(54) PORE PRESSURE IN UNCONVENTIONAL FORMATIONS

(71) Applicant: Saudi Arabian Oil Company, Dhahran (SA)

(72) Inventor: Mohammed Boudjatit, Jijel (DZ)

(73) Assignee: Saudi Arabian Oil Company, Dhahran (SA)

( * ) Notice: Subject to any disclaimer, the term of this patent is extended or adjusted under 35 U.S.C. 154(b) by 194 days.

(21) Appl. No.: 18/456,058

(22) Filed: Aug. 25, 2023

(65) Prior Publication Data

US 2023/0400599 A1    Dec. 14, 2023

Related U.S. Application Data

(62) Division of application No. 17/152,227, filed on Jan. 19, 2021, now abandoned.

(51) Int. Cl.
*G01V 1/50* (2006.01)
*E21B 47/06* (2012.01)
*E21B 49/00* (2006.01)

(52) U.S. Cl.
CPC ............... *G01V 1/50* (2013.01); *E21B 47/06* (2013.01); *E21B 49/005* (2013.01); *E21B 49/006* (2013.01)

(58) Field of Classification Search
CPC ...... E21B 47/06; E21B 49/005; E21B 49/006; E21B 2200/20; G01V 1/50; G01V 2210/6222; G01V 2210/6248
See application file for complete search history.

(56) References Cited

U.S. PATENT DOCUMENTS

| | | | |
|---|---|---|---|
| 6,351,991 B1 * | 3/2002 | Sinha | G01V 1/50 73/152.16 |
| 6,751,558 B2 * | 6/2004 | Huffman | G01V 1/32 702/14 |
| 7,668,043 B2 * | 2/2010 | Wu | G01V 1/48 367/31 |
| 10,353,094 B2 * | 7/2019 | Sinha | G01V 1/50 |
| 10,385,678 B2 * | 8/2019 | Nguyen | E21B 47/06 |

(Continued)

FOREIGN PATENT DOCUMENTS

WO    WO 9104500    4/1991

OTHER PUBLICATIONS

Zhang et al. "Challenges and Surprises of Abnormal Pore Pressures in Shale Gas Formations" SPE 145964 (Year: 2011).*
Bowers, "Pore pressure estimation from velocity data: accounting for overpressure mechanisms besides under compactions" SPE Drilling & Completion, IADC/SPE Drilling conference, Jun. 1995, 7 pages.

(Continued)

*Primary Examiner* — John Fitzgerald
(74) *Attorney, Agent, or Firm* — Fish & Richardson P.C.

(57) ABSTRACT

Disclosed are methods, systems, and computer-readable medium to perform operations including: receiving a density log and a compressional slowness log measured in a wellbore located in a formation; generating, based on at least one of the density log or the compressional slowness log, a reference compressional slowness log; determining, for an interval in the formation, a relationship between the compressional slowness log and the reference compressional slowness log; generating, based on the relationship and known pressure information in the interval, a pressure scale for the formation; and using the pressure scale to calculate pressure in the interval.

13 Claims, 10 Drawing Sheets

(56) References Cited

U.S. PATENT DOCUMENTS

| | | | | |
|---|---|---|---|---|
| 11,719,843 | B2* | 8/2023 | Horne | G01V 11/002 |
| | | | | 702/6 |
| 11,835,673 | B2* | 12/2023 | Wang | G01V 1/50 |
| 11,892,590 | B2* | 2/2024 | Haceb | G01N 24/081 |
| 11,927,711 | B2* | 3/2024 | Wang | E21B 49/00 |
| 2003/0151975 | A1* | 8/2003 | Zhou | G01V 1/50 |
| | | | | 367/31 |
| 2005/0065730 | A1* | 3/2005 | Sinha | G01V 1/50 |
| | | | | 702/7 |
| 2006/0039238 | A1* | 2/2006 | Mandal | G01V 1/48 |
| | | | | 367/31 |
| 2012/0192640 | A1* | 8/2012 | Minh | E21B 47/017 |
| | | | | 73/152.16 |
| 2013/0081804 | A1* | 4/2013 | Sinha | G07F 17/0092 |
| | | | | 166/250.01 |
| 2015/0123665 | A1* | 5/2015 | Mukhopadhyay | G01V 3/08 |
| | | | | 324/338 |
| 2017/0061049 | A1* | 3/2017 | Czerniak | E21B 47/06 |

OTHER PUBLICATIONS

Couszens-Schultz, "Pore Pressure: Prediction in Unconventional Resources," IPTC-16849-MS, presented at the IPTC, Beijing, China, Mar. 26-28, 2013, 11 pages.

Eaton, "The Equation for Geopressure Prediction from Well Logs," SPE of AIME, SPE 5544, 1975, 11 pages.

Elmahdy et al., "Pore pressure prediction in unconventional carbonate reservoir," presented at the SPE Kingdom of Saudi Arabia Annual Technical Symposium and Exhibition, Dammam, Saudi Arabia, Apr. 2018, 11 pages.

Zhang et al., "Pore pressure prediction from well logs: methods, modifications, and new approaches," Jun. 2011, 108(1):50-63, 14 pages.

PCT International Search Report and Written Opinion in International Appln. No. PCT/US2022/012767, dated May 11, 2022, 17 pages.

* cited by examiner

PORE PRESSURE IN UNCONVENTIONAL FORMATIONS

CROSS-REFERENCE TO RELATED PATENT APPLICATIONS

This application is a divisional of and claims the benefit of priority to U.S. patent application Ser. No. 17/152,227, filed Jan. 19, 2021, the contents of which are incorporated by reference herein.

TECHNICAL FIELD

This description relates to pore pressure in unconventional formations.

BACKGROUND

In the oil and gas industry, unconventional formations are formations that require specialized recovery operations outside traditional operations. An example of unconventional formations is a shale play, which is an accumulation of shales that exhibit similar geological characteristics. Shales are fine-grained sedimentary rocks that can be a source of hydrocarbons (for example, oil or natural gas). Shales from which hydrocarbons have been generated or are capable of being generated are referred to as (shale) source rock. Some shale plays are located near aquifers (for example, above aquifers), which are underground layers of fluid-bearing permeable rock or rock fractures. Formations that include different types of underground sections (for example, source rock and aquifers) can be partitioned into discrete intervals, where each interval is characterized based on information such as that interval's geophysical properties.

SUMMARY

Pore pressure (also referred to as "formation pressure") is used in various aspects of oil and gas exploration, and is particularly significant for safe and efficient drilling operations. For example, overpressures (that is, pressures that exceed hydrostatic pressure) or other anomalous pressures can pose risk to drilling operations, perhaps by resulting in blowouts, pressure kicks, or fluid influx into a wellbore. Accurate pore pressure data enables detection of these risks, which in turn, allows these risks to be avoided or mitigated. For example, accurate pore pressure can be used to determine the mud weight of the drilling fluids that are injected into the wellbore. In particular, the determined mud weight is calculated such that the drilling fluid prevents the pore pressure from causing the wellbore or the formation surrounding the wellbore to collapse.

Pore pressure estimation or calculation in unconventional formations, such as shale plays, is challenging for several reasons. One reason is that the low permeability of unconventional formations prevents existing formation testing tools from directly measuring the pore pressure. In practice, some approaches use compressional velocity or compressional slowness to predict pore pressure in conventional formations. However, pore pressure in unconventional formations is primarily controlled by hydrocarbon generation, pressure dissipation, and overburden. Further, the presence and composition of organic matter in unconventional formations considerably affects the compressional slowness measurement. For these reasons, the existing approaches for predicting formation pressure in conventional formations cannot be used for unconventional formations.

This disclosure describes methods and systems for calculating pore pressure in unconventional formations, and for performing actions based on the calculated pore pressure. In some embodiments, the disclosed methods and systems use a compressional slowness log and a density log to calculate the pore pressure. Generally, these logs are based on fluid type, pore pressure, and rock composition in a formation. The disclosed methods and systems use these logs in a way that eliminates the effects of rock composition, fluid type, and organic matter. Thus, the effect due to pore pressure remains, and the pore pressure can be calculated. The calculated pore pressure can be used by a drilling system to adjust drilling parameters to ensure a stable borehole and to avoid drilling fluid losses or gas kickoff. For example, the mud weight used in a drilling system can be calculated based on the pore pressure. Then, the drilling system can control the mud weight based on the calculation.

Aspects of the subject matter described in this specification may be embodied in methods that include the operations for calculating pore pressure in an unconventional formation. In one embodiment, the operations involve receiving a density log and a compressional slowness log measured in a wellbore located in a formation; generating, based on at least one of the density log or the compressional slowness log, a reference compressional slowness log; determining, for an interval in the formation, a relationship between the compressional slowness log and the reference compressional slowness log; generating, based on the relationship and known pressure information in the interval, a pressure scale for the formation; and using the pressure scale to calculate pressure in the interval.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, generating, based on at least one of the density log or the compressional slowness log, the reference compressional slowness log involves: plotting the density log and the compressional slowness log on the same graph; creating a copy of the compressional slowness log; and shifting the copy of the compressional slowness log to overlap the density log, wherein the copy of the compressional slowness log is designated the reference compressional slowness log.

In some implementations, determining, for the interval in the formation, the relationship between the compressional slowness log and the reference compressional slowness log involves: generating a cross plot of the compressional slowness log and the reference compressional slowness log for the interval, where the cross plot comprises values from the compressional slowness log and the reference compressional slowness log for the interval; and using linear regression to generate a linear best-fit line for the values, where the linear best-fit line defines the relationship between the relationship between the compressional slowness log and the reference compressional slowness log.

In some implementations, generating, based on the relationship and known pressure information from the interval, the pressure scale for the formation involves defining the pressure scale as: $P = \alpha * \log(DT_{ref}) + \beta$, where $\alpha$ and $\beta$ are derived based on the known pressure information.

In some implementations, generating, based on the relationship and known pressure information from the interval, the pressure scale for the formation involves plotting the known pressure information in a cross plot of reference compressional slowness and pore pressure; and generating, based on the relationship, a best-fit line for the plotted known pressure information, wherein the plotted best-fit line is the pressure scale.

In some implementations, the density log is a first density log, the compressional slowness log is a first compressional slowness log, the reference compressional slowness log is a first reference compressional slowness log, the interval is a first interval, the relationship is a first relationship, and the operations further involve: generating, based on at least one of a second density log or a second compressional slowness log, a second reference compressional slowness log; determining, for a second interval in the formation, a second relationship between the second compressional slowness log and the second reference compressional slowness log; and calculating, using the pressure scale and the second relationship, pressure in the second interval.

In some implementations, the operations further involve calculating a mud weight based on the calculated pressure in the interval. In some implementations, the operations further involve controlling a drilling system based on the calculated mud weight. For example, a fluid circulation system is controlled such that the mud (also referred to as "drilling fluid") provided by the fluid circulation system has a weight equal to or similar to (for example, within a predefined threshold) of the calculated mud weight.

The subject matter described in this specification can be implemented in particular implementations so as to realize one or more of the following advantages. The disclosed techniques enable direct pore pressure calculation, which is not achievable using existing approaches. Furthermore, the disclosed techniques use equation-based and chart-based techniques for rapid pore pressure calculations. By enabling rapid and direct pore pressure calculations, the disclosed techniques improve the efficiency of resources, such as time and computational power. Additionally, the disclosed techniques improve optimization of drilling operations, hydraulic fracturing, and reservoir simulation models. For example, the accurate pore pressure calculations in unconventional formations enables detecting risks to drilling operations in such formations, which is not achievable using existing techniques.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE DRAWINGS

Like reference numbers and designations in the various drawings indicate like elements.

DETAILED DESCRIPTION

In line with the discussion above, the responses of porosity logs (for example, density, compressional slowness, and neutron-porosity logs) in an unconventional formation are controlled by an amount of organic matter present in the formation, an amount of fluid present in the pores of the formation, and mineralogy of the formation. In shale plays, the overpressure in source rocks is primarily controlled by the maturity of the rocks, the conversion of organic matter into hydrocarbons, and the formation of organic porosity. In view of this, this disclosure assumes that in homogeneous formations where the rock composition and fluid type are generally uniform, the difference in compressional acoustic slowness readings between wells for the same interval is due to the variation in pore pressure and organic matter content.

Figure 1A:
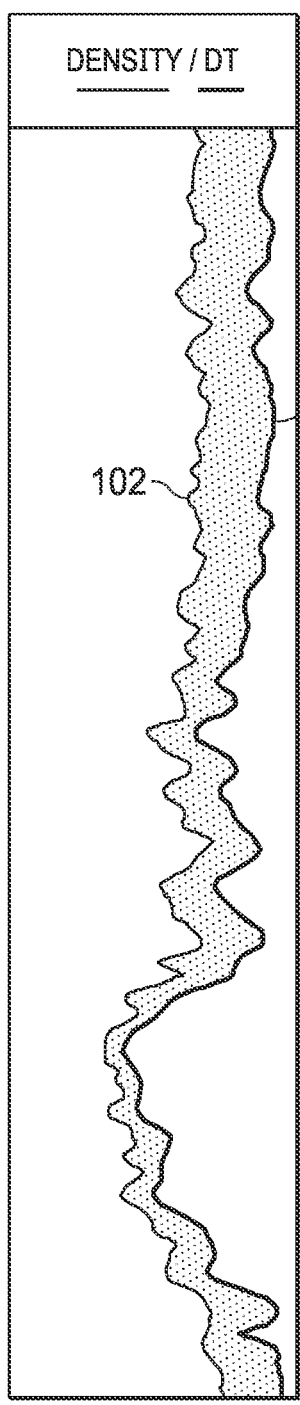
FIG. 1A and FIG. 1B illustrate example density logs and compressional velocity logs in an unconventional formation, according to some implementations of the present disclosure.
Figure 1B:
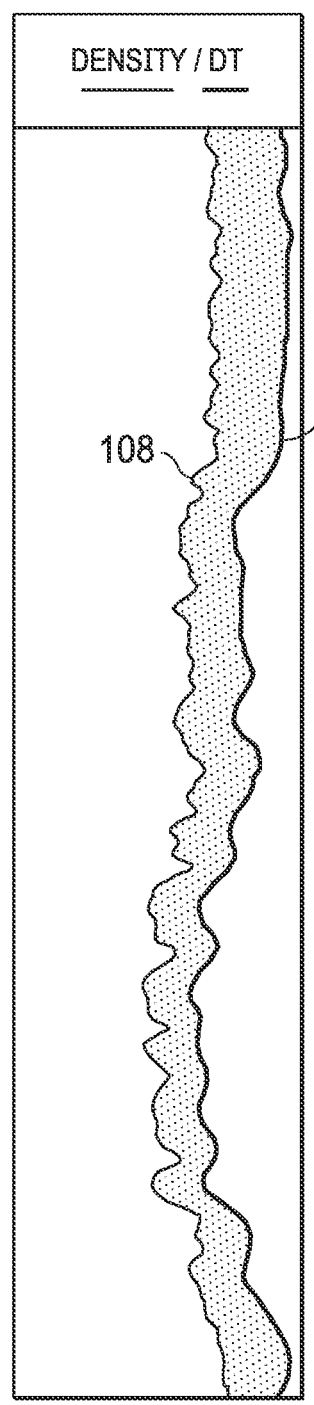

FIG. 1A and FIG. 1B illustrate graphical representations of example density logs and compressional velocity logs in an unconventional formation, according to some implementations. Specifically, FIG. 1A illustrates a graph 100 that includes a density log 102 and a compressional velocity log ("DT" or "ΔT") 104 for a first well in the unconventional formation. FIG. 1B illustrates a graph 106 that includes a density log 108 and a compression velocity log 110 for a second well in the unconventional formation. As shown in FIG. 1A and FIG. 1B, compressional slowness and density are not similar in each well. As further shown in FIG. 1A and FIG. 1B, the separation between density and compressional slowness is variable in each well. This variation is due to variation in both organic content and pore pressure.

However, this disclosure assumes that, due to the low depth of investigation of density logs, density logs are not affected by pore pressure. Accordingly, this disclosure concludes that, for locations with the same density value in a formation, any variation in compressional slowness readings is attributed to variation in pore pressure (as far as rock composition is not changing). This concept is illustrated in FIG. 2.

Figure 2:
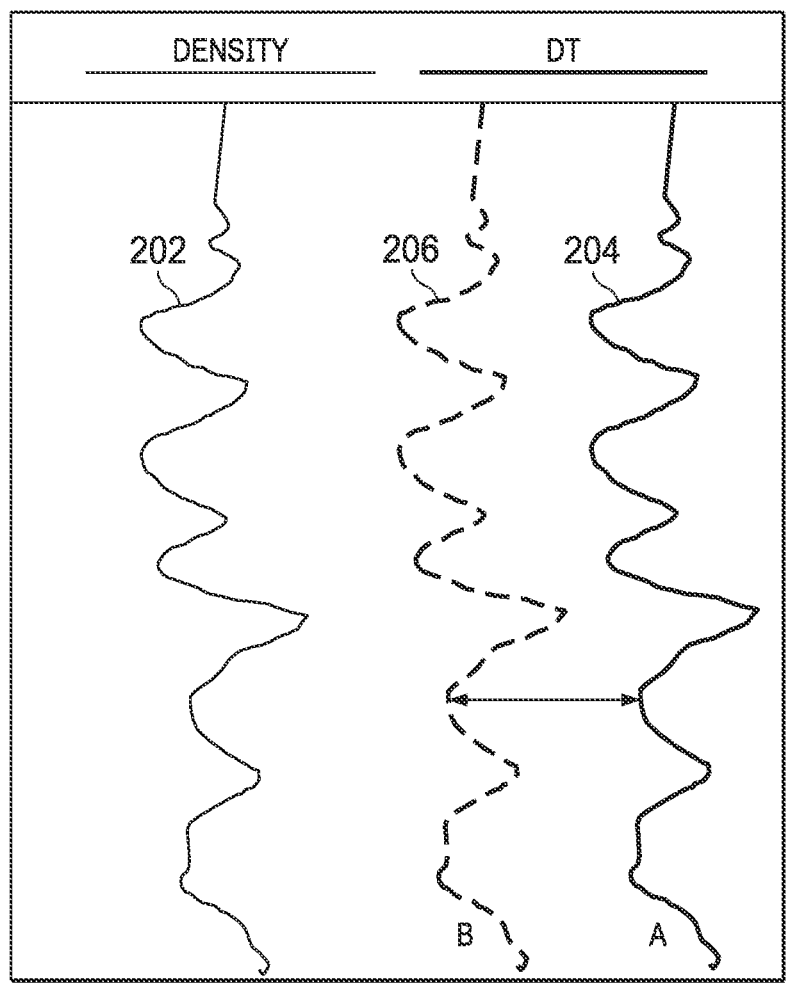
FIG. 2 illustrates a comparison of compressional slowness for two wells, according to some implementations of the present disclosure.

FIG. 2 illustrates a graph 200 that compares compressional slowness for two wells that have the same density, according to some implementations. The graph 200 includes a density log 202 of the two wells, a compressional slowness log 204 for a first well (labelled as well "A"), and a compressional slowness log 206 for a second well (labelled as well "B"). As described in the previous paragraph, the variation in compressional slowness readings for the same density value is attributed to variation in pore pressure. Thus, any variation of compressional slowness values from the compressional slowness log 204 to the compressional slowness log 206 for the same density is interpreted as variation solely in formation pressure (since, in this case, it is assumed that porosity and organic matter content do not vary).

Based on this concept, this disclosure describes methods and systems for direct pore pressure calculation in unconventional formations. In some embodiments, a pore pressure calculation system is configured to directly calculate pore pressure in a formation, such as an unconventional formation. As described below, the pore pressure calculation system uses the concept that variation of compressional slowness values for the same density in a formation is interpreted as variation in formation pressure. Further, pore pressure calculation system, or another drilling system, uses the calculated pore pressure to perform actions, such as controlling the weight of drilling mud or controlling one or more drilling components (for example, the drilling components of FIG. 11).

Figure 3:
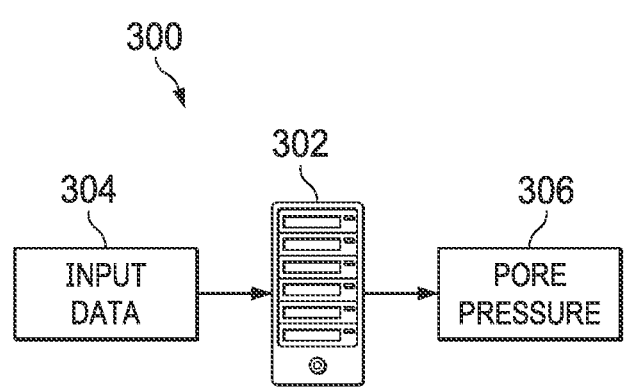
FIG. 3 illustrates an example pore pressure calculation system (PPCS), according to some implementations of the present disclosure.

FIG. 3 illustrates an example pore pressure calculation system (PPCS) 300, according to some implementations. The PPCS 300 is configured to calculate pore pressure in formations, such as unconventional formations (for example, shale plays or mudstone source rock formations). As shown in FIG. 3, the PPCS 300 includes a computer system 302 that receives input data 304, perhaps from another computer system. As described in more detail below, the computer system 302 uses the input data 304 to calculate pore pressure 306 in a formation. The computer system 302 can be a computer system that is the same as, or similar to, computer system 1000 of FIG. 10. In the following discussion of FIG. 3, reference is also made to FIG. 4, FIG. 5, FIG. 6, FIG. 7, and FIG. 8.

In some embodiments, the input data 304 includes data associated with an unconventional formation in which the PPCS 300 is calculating pore pressure. In some examples, the input data 304 includes one or more density logs and one or more compressional slowness logs ("$\Delta T_{log}$" or "$DT_{log}$") measured in one or more wells of the unconventional formation. The compressional slowness logs can be sonic logs, for example.

In some embodiments, in response to receiving the input data 304, the computer system 302 generates a reference compressional slowness log ("$\Delta T_{ref}$" or "$DT_{ref}$") for a well in the formation. In particular, the computer system 302 generates the reference compressional slowness log based on the density log and the compressional slowness log for the well. The reference compressional slowness log is generated such that it overlaps with the density log when plotted on the same graph. In one example, the computer system 302 generates the reference compressional slowness log by plotting the density log and the compressional slowness log on the same graph. The computer system 302 then generates a copy of the compressional slowness log and shifts the copy to overlap with the density log. The shifted copy is designated as the reference compressional slowness log. In another example, the computer system 302 generates the reference compressional slowness log by deriving a relationship between the compressional slowness log and the density log. In this example, the computer system 302 selects a plurality of points from both logs, plots the plurality of points, derives a relationship between the compressional slowness log and the density log based on the plotted points, and generates the reference compressional slowness log based on the derived relationship.

In some embodiments, because the reference compressional slowness log overlaps the density log, the computer system 302 derives density information based on the reference compressional slowness log. For example, the computer system 302 determines that locations in the formation that have the same reference compressional slowness values also have the same density. Conversely, the computer system 302 determines that locations that have different reference compressional slowness values have different densities. Because the reference compressional slowness values are indicative of density information, the computer system 302 can use the reference compressional slowness log to determine a compressional slowness variation, for example, for locations that have the same density.

Figure 4:
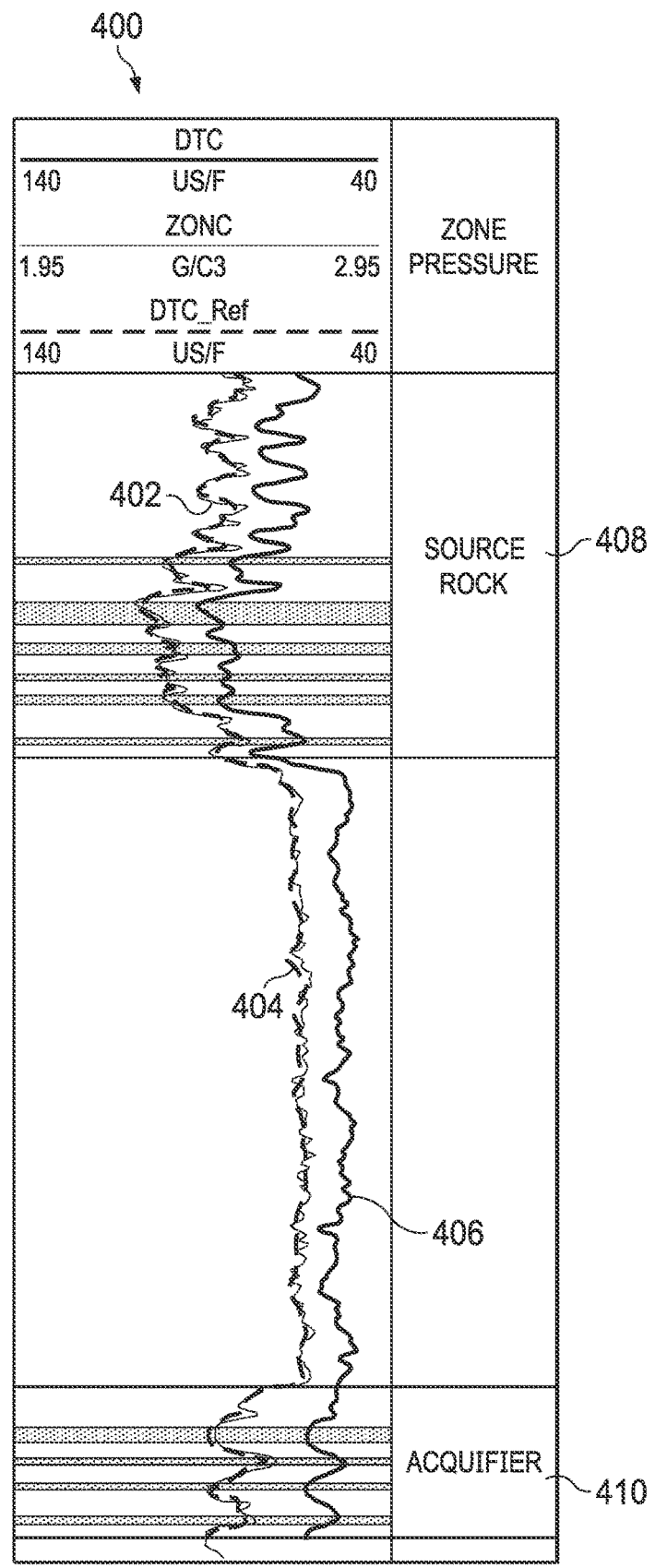
FIG. 4 illustrates a density log, a reference compressional slowness log, and a compressional slowness log of a formation, according to some implementations of the present disclosure.

FIG. 4 illustrates a graph 400 that includes a density log 402, a reference compressional slowness log 404, and a compressional slowness log 406, according to some implementations. As shown in FIG. 4, the density log 402 and the compressional slowness log 404 are plotted on the same graph 400. The plot of the reference compressional slowness log 404 can be generated, for example, by making a copy of the compressional slowness log 406 and shifting the copy to overlap with the density log 402. Additionally, sections of the density log 402, the reference compressional slowness log 404, and the compressional slowness log 406 that correspond to different intervals in a well can be identified. The intervals of interest are, for example, intervals of source rock. The intervals of interest can be identified by depths of interest, perhaps based on the input data 302 or user input. In the example of FIG. 4, there are two intervals of interest: source rock interval 408 and aquifer interval 410. As shown in FIG. 4, portions of the logs 402, 404, 406 that correspond to the two intervals can be identified.

In some embodiments, the computer system 302 generates a cross plot of the reference compressional slowness and the compressional slowness for an interval. The y-axis of the cross plot is reference compressional slowness and the x-axis is compressional slowness. The computer system 302 plots reference compressional slowness as a function of compressional slowness for the interval. The computer system 302 then uses linear regression to generate a best-fitting linear line that fits the plotted values. The computer system 302 generates the best-fit line in order to determine a relationship between reference compressional slowness and compressional slowness for that interval. Because the relationship between the reference compressional slowness and the compressional slowness describes how the compressional slowness varies in an interval, the best-fit line is indicative of variation pore pressure. As such, the best-fit linear line for an interval is also referred to as a pressure gradient or pressure trend for that interval.

In some embodiments, the computer system 302 plots the reference compressional slowness and the compressional slowness values for more than one interval in the formation. In these embodiments, the computer system 302 generates a respective pressure gradient for each interval. In some examples, the computer system 302 uses the pressure gradients to determine the pressure difference between intervals. As an example, the computer system 302 compares a first pressure gradient of a first interval and a second pressure gradient of a second interval. If the first pressure gradient has greater compressional slowness values than the second gradient for the same reference compressional slowness values, then the computer system 302 determines that the first interval has a greater pressure than the second interval.

In some embodiments, the best-fit lines can also be represented as linear equations using Equation (1):

$$DT_{ref} = a*DT_{log} + b,\qquad\text{Equation (1).}$$

Equation (1) defines the relationship between compressional slowness and reference compressional slowness in an interval. In Equation (1), a and b are constants that are calculated for each interval from the pressure gradient of that interval.

Figure 5:
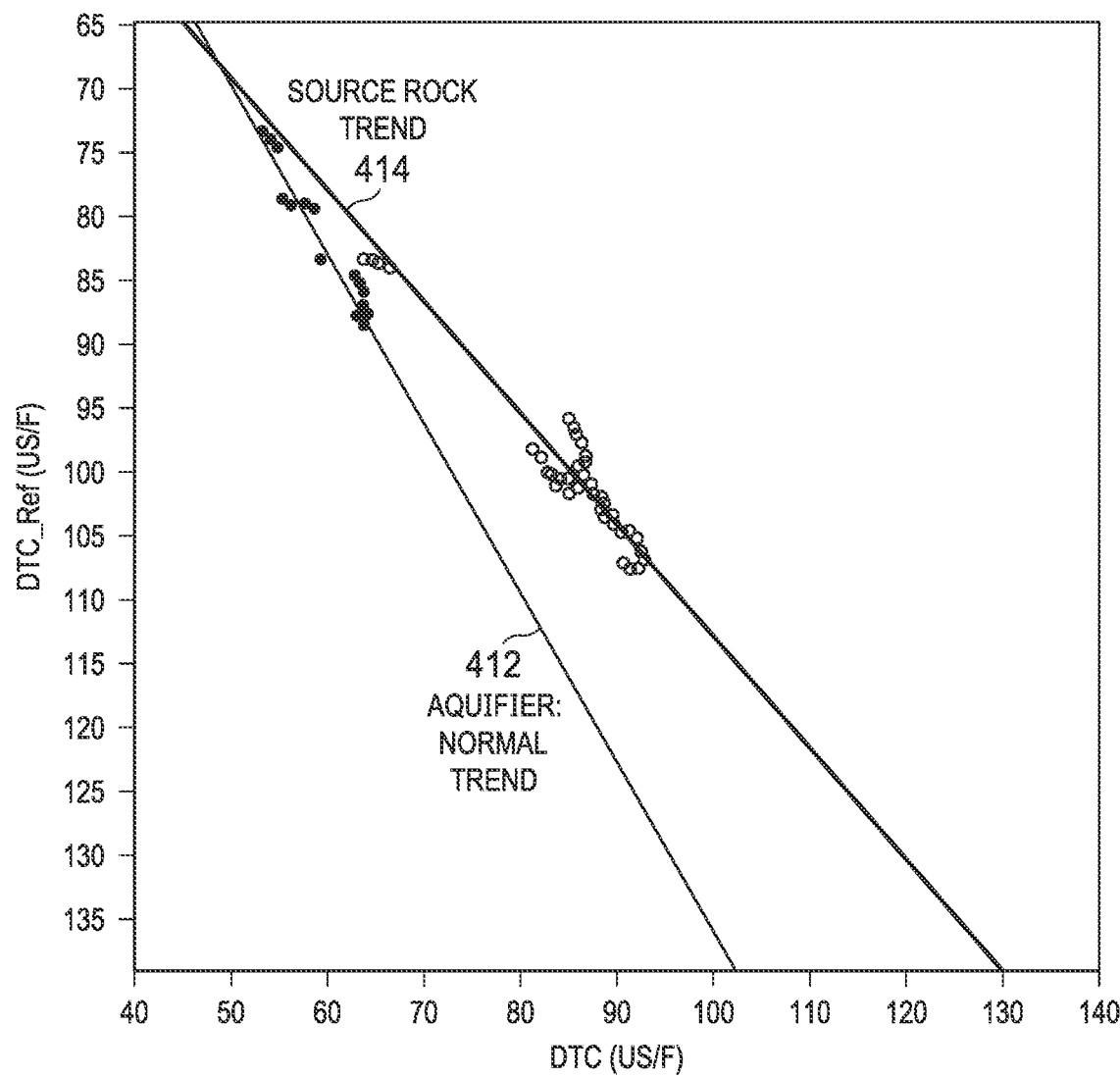
FIG. 5 illustrates a cross plot of the reference compressional slowness and the compressional slowness, according to some implementations of the present disclosure.

FIG. 5 illustrates a cross plot 500 of reference compressional slowness and compressional slowness, according to some implementations. In this example, the cross plot 500 includes values from the compressional slowness and reference compressional slowness logs of FIG. 4. Specifically, the cross plot 500 includes values associated with the source rock interval and the aquifer interval. As shown in FIG. 5, a respective pressure gradient is generated for each interval. In FIG. 5, pressure gradient 502 corresponds to the aquifer interval and pressure gradient 504 corresponds to the source rock interval. In some examples, the aquifer pressure gradient 502 is compared to the source rock pressure gradient 504. A comparison of the gradients shows that for the same reference compressional slowness values, the compressional slowness values of the source rock pressure gradient 504 are greater than the compressional slowness values of the aquifer gradient 502. Thus, it is concluded that there is an increase in pore pressure from the aquifer interval to the source rock interval.

Figure 6:
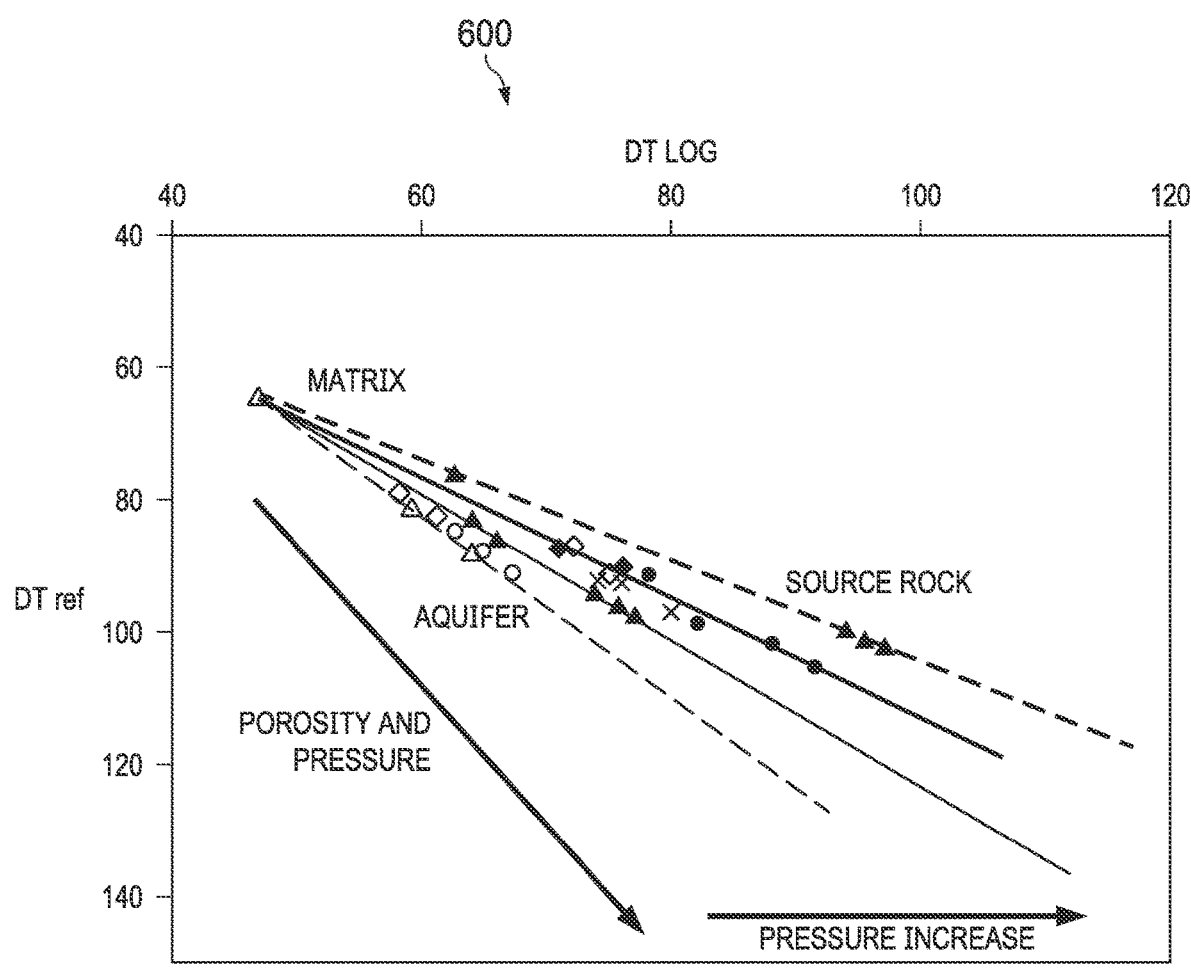
FIG. 6 illustrates a cross plot of reference compressional slowness and compressional slowness for a plurality of wells of a formation, according to some implementations of the present disclosure.

FIG. 6 illustrates a cross plot 600 of reference compressional slowness and compressional slowness for a plurality of wells in a formation, according to some implementations. In FIG. 6, a respective pressure gradient is generated for one or more intervals in each of the plurality of wells. As shown in FIG. 6, different wells have different pressure gradients. However, all of the pressure gradients intercept at a common point. This point corresponds to a matrix compressional slowness where the pore pressure is equal to zero (that is, where the formation lacks porosity). As shown by arrow 602, an increase in compressional slowness values for the same reference compressional slowness value is indicative of an increase in pore pressure. As shown by arrow 604, variation along the pressure gradients is indicative of changes in porosity and pressure. Furthermore, due to the relationship between reference compressional slowness and compressional slowness, wells that lie on the same pressure gradient exhibit the same pore pressure.

In some embodiments, the computer system 302 uses a pressure gradient to generate a pressure scale that can be used to determine pore pressure values in the formation. In particular, the computer system 302 uses known pressure information from the interval with which the pressure gradient is associated in order to convert the pressure gradient to a pressure scale. The known pressure information can be determined using, for example, diagnostic fracture injection test (DFIT) data. In one embodiment, the pressure scale is equation based. Specifically, the pressure scale is defined as:

$$P(\text{psi}) = \alpha*\log(DT_{ref}) + \beta,\qquad\text{Equation (2).}$$

As shown in Equation (2), the pressure scale is a function of the pressure gradient. Further, $\alpha$ and $\beta$ are constants that can be derived from the known pressure information. For example, if the pressure gradient is an aquifer pressure gradient, $\alpha$ and $\beta$ can be derived using known aquifer pressure data. Note that in examples where the pressure gradient is an aquifer pressure gradient, the constants can alternatively be derived using a water gradient. More specifically, the constants can be calculated by plotting calibration pore pressure points (for example, known pressure points) versus the reference compressional log. A best-fit curve, such as the logarithmic trend curve of Equation (2), is calculated for the plotted points. Then, the constants $\alpha$ and $\beta$ are determined from the plotted best-fit curve.

In another embodiment, the pressure scale is graph based. In this embodiment, the computer system 302 plots known pore pressure values of an interval as a function of reference compressional slowness. Then, the pressure gradient associated with the interval is scaled and calibrated into a graphical pressure scale. For example, best-fit curve, such as a logarithmic trend curve, is determined for the plotted points. The best-fit curve is the graphical pressure scale that converts reference compressional slowness values into pore pressure.

Figure 7:
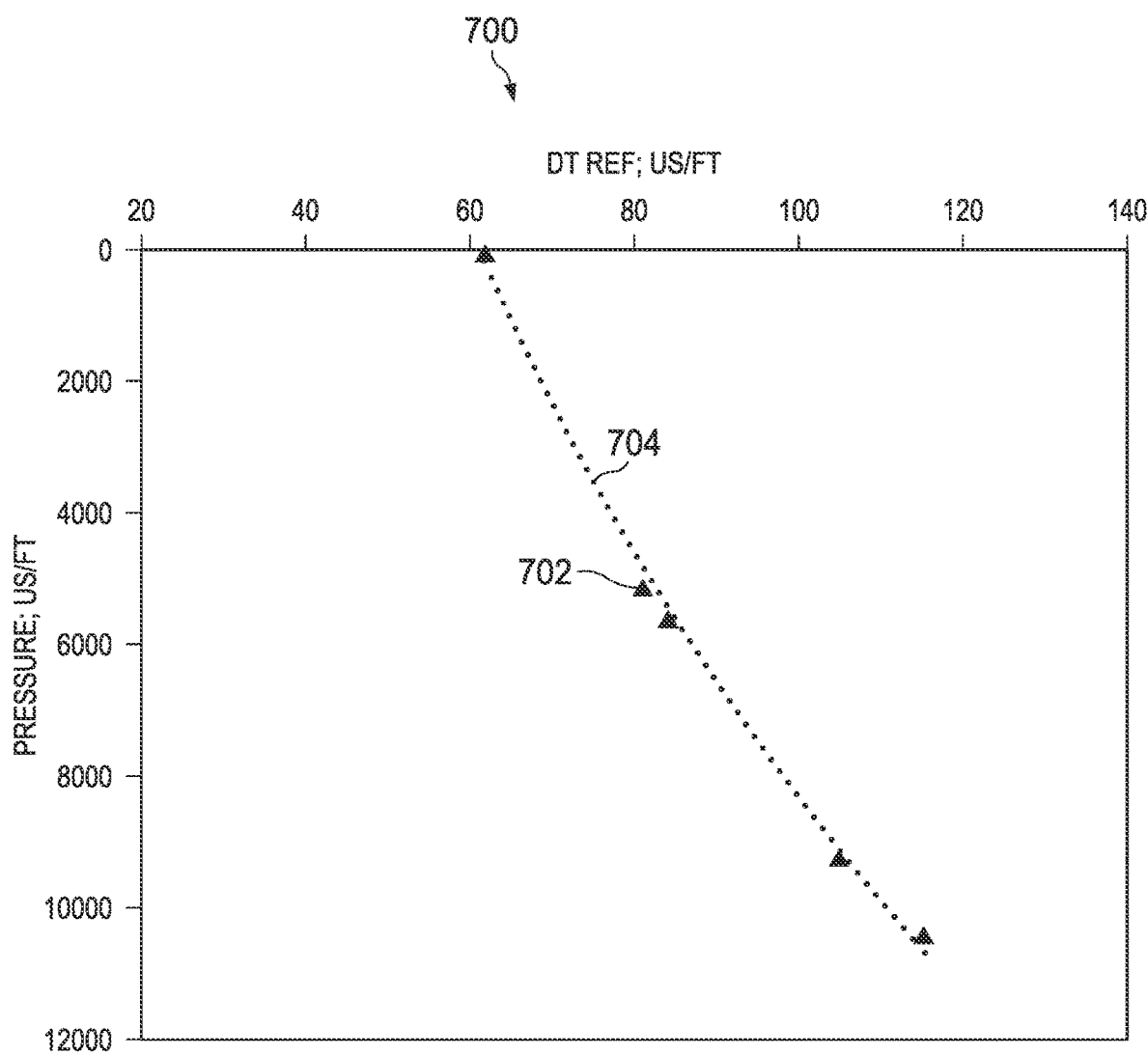
FIG. 7 illustrates a plot of reference compressional slowness as a function of formation pressure, according to some implementations of the present disclosure.

FIG. 7 illustrates a cross plot 700 of the reference compressional slowness and pore pressure, according to some implementations. The cross plot 700 includes one or more known pressure values called calibration points. In FIG. 7, the calibration points, such as calibration point 702, are represented using triangle graphical elements. In an example, a pressure scale 704 that fits the calibration points is determined based on a pressure gradient of the interval with which the calibration points are associated. For instance, if the calibration points are from an aquifer interval, then the aquifer pressure gradient can be used to derive the pressure scale 704.

In some embodiments, the computer system 302 uses the pressure scale to determine pore pressure values in the formation. Specifically, the computer system 302 can use Equation (2) or the cross plot 700 to calculate the pore pressure for a particular value of reference compressional velocity for an interval in the formation. In some examples, the computer system 302 uses a graph-based approach for calculating pore pressure. The graph-based approach is described in FIG. 8.

Figure 8:
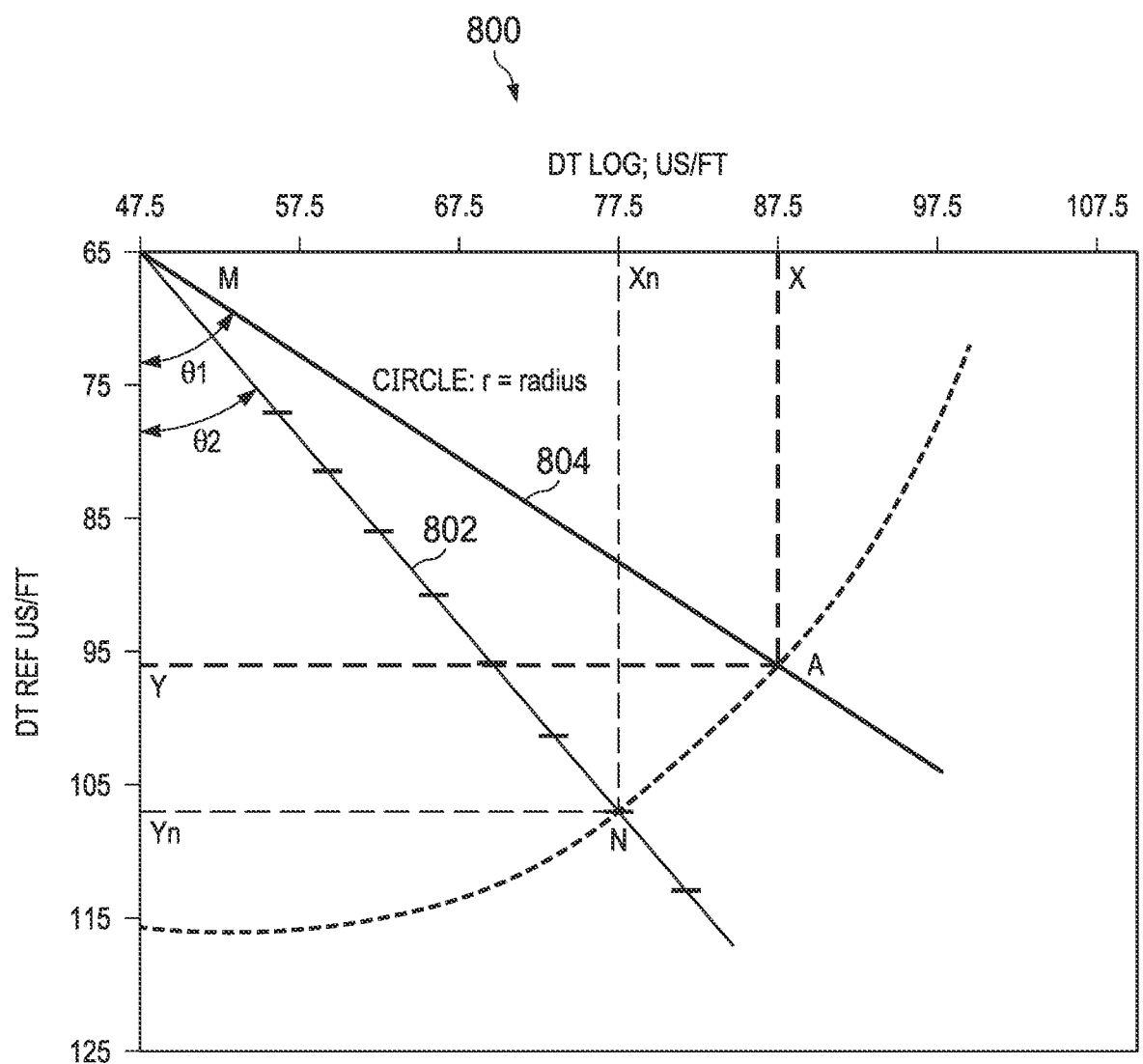
FIG. 8 illustrates a graph-based approach for calculating pore pressure, according to some implementations of the present disclosure.

FIG. 8 illustrates a graph-based approach for calculating pore pressure, according to some implementations. FIG. 8 illustrates a normal pressure gradient 802 that is associated with an interval from which pressure values are known. For example, the normal pressure gradient 802 is associated with an aquifer interval with known pressure values. The known pressure values and the normal pressure gradient 802 can be used to calculate pore pressures in the interval. As such, the pressure along the normal pressure gradient 802 is known.

In some embodiments, source rock pressure gradients can be obtained by rotating the normal pressure gradient 802 at a specific angle. This can be done since all trends intercept at the same common point corresponding to the matrix compressional slowness point "M," as shown in FIG. 6 and FIG. 8. For example, a source rock gradient 804 can be obtained by rotating the normal pressure gradient 802 to an angle $\theta_1$.

Therefore, for any point N that has coordinates $(X_n, Y_n)$ on the normal trend, the distance "r" from the reference point M (that is, the matrix point) to the point N corresponds to a circle with a center at point M and a radius equal to "r." Accordingly, all points on the same circle have the same pressure. In some embodiments, the relationship between reference compressional slowness and compressional slowness at point N can be expressed using Equation (3), where "r" represents the pressure magnitude for point N:

$$(X_n)^2 + (Y_n)^2 = r^2, \quad \text{Equation (3)}$$

Therefore, for any point A with compressional slowness value X and reference compressional slowness value Y, the formation pressure can be calculated by rotating clockwise the point A to the equivalent point N $(X_n, Y_n)$ located on the normal trend. The rotation can be performed by following a circle of radius "r" equal to the distance MA as all points on the same circle will have the same pressure. The formation pressure can be determined graphically by deriving the pore pressure of point N on the normal trend. Alternatively, the formation pressure can be determined empirically by calculating a new $Y_n$ (that is, an equivalent reference compressional slowness value) using Equation (4):

$$Y_n = Y \frac{\cos(\theta_2)}{\cos(\theta_1)}, \quad \text{Equation (4)}.$$

Then, Equation (2) can be used the used to convert $Y_n$ (that is, DTref) to formation pressure. Alternatively, the graph in FIG. 7 can be used to convert $Y_n$ to formation pressure.

Figure 9:
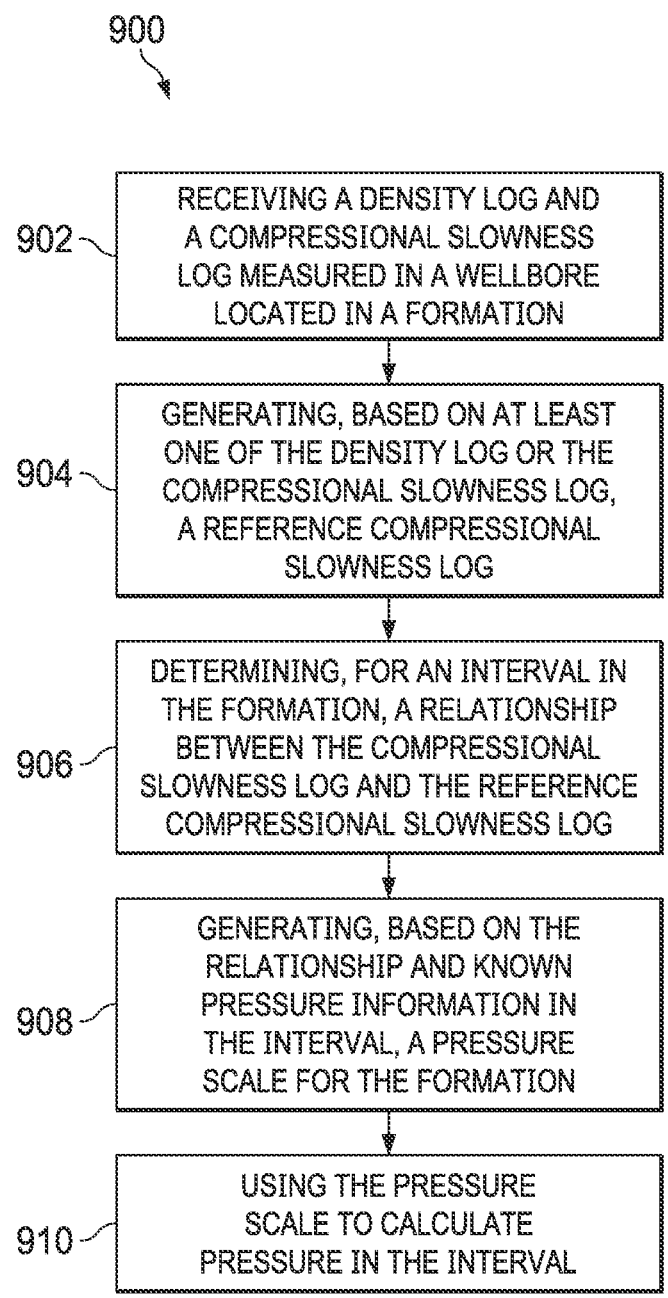
FIG. 9 illustrates a flowchart of an example method, according to some implementations of the present disclosure.

FIG. 9 illustrates a flowchart of an example method 900, according to some implementations. For clarity of presentation, the description that follows generally describes method 900 in the context of the other figures in this description. For example, the method 900 can be performed by the computer system 1000 shown in FIG. 10. However, it will be understood that the method 900 may be performed, for example, by any suitable system, environment, software, and hardware, or a combination of systems, environments, software, and hardware, as appropriate. In some implementations, various steps of the method 900 can be run in parallel, in combination, in loops, or in any order.

At step 902, the method 900 involves receiving a density log and a compressional slowness log measured in a wellbore located in a formation.

At step 904, the method 900 involves generating, based on at least one of the density log or the compressional slowness log, a reference compressional slowness log.

At step 906, the method 900 involves determining, for an interval in the formation, a relationship between the compressional slowness log and the reference compressional slowness log.

At step 908, the method 900 involves generating, based on the relationship and known pressure information in the interval, a pressure scale for the formation.

At step 910, the method 900 involves using the pressure scale to calculate pressure in the interval.

In some implementations, generating, based on at least one of the density log or the compressional slowness log, the reference compressional slowness log involves: plotting the density log and the compressional slowness log on the same graph; creating a copy of the compressional slowness log; and shifting the copy of the compressional slowness log to overlap the density log, wherein the copy of the compressional slowness log is designated the reference compressional slowness log.

In some implementations, determining, for the interval in the formation, the relationship between the compressional slowness log and the reference compressional slowness log involves: generating a cross plot of the compressional slowness log and the reference compressional slowness log for the interval, where the cross plot comprises values from the compressional slowness log and the reference compressional slowness log for the interval; and using linear regression to generate a linear best-fit line for the values, where the linear best-fit line defines the relationship between the relationship between the compressional slowness log and the reference compressional slowness log.

In some implementations, generating, based on the relationship and known pressure information from the interval, the pressure scale for the formation involves defining the pressure scale as: $P = \alpha * \log(DT_{ref}) + \beta$, where $\alpha$ and $\beta$ are derived based on the known pressure information.

In some implementations, generating, based on the relationship and known pressure information from the interval, the pressure scale for the formation involves plotting the known pressure information in a cross plot of reference compressional slowness and pore pressure; and generating, based on the relationship, a best-fit line for the plotted known pressure information, wherein the plotted best-fit line is the pressure scale.

In some implementations, the density log is a first density log, the compressional slowness log is a first compressional slowness log, the reference compressional slowness log is a first reference compressional slowness log, the interval is a first interval, the relationship is a first relationship, and the method 900 further involves: generating, based on at least one of a second density log or a second compressional slowness log, a second reference compressional slowness log; determining, for a second interval in the formation, a second relationship between the second compressional slowness log and the second reference compressional slowness log; and calculating, using the pressure scale and the second relationship, pressure in the second interval.

In some implementations, the method 900 further involves calculating a mud weight based on the calculated pressure in the interval. In some implementations, the method 900 further involves controlling a drilling system based on the calculated mud weight. For example, the fluid circulation system 1108 of FIG. 11 (described in more detail below) is controlled such that the mud (also referred to as "drilling fluid") provided by the fluid circulation system 1108 has a weight equal to or similar to (for example, within a predefined threshold) of the calculated mud weight.

Figure 10:
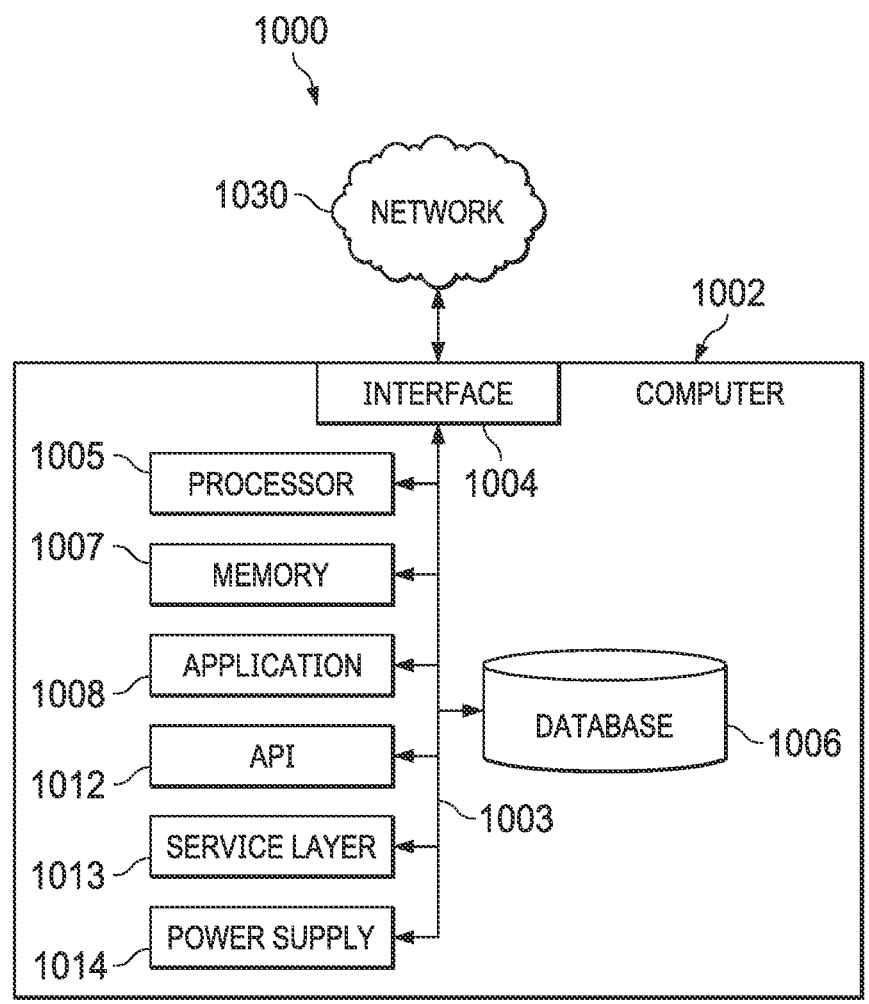
FIG. 10 illustrates a block diagram of an example computer system, according to some implementations of the present disclosure.

FIG. 10 is a block diagram of an example computer system 1000 that can be used to provide computational functionalities associated with described algorithms, methods, functions, processes, flows, and procedures described in the present disclosure, according to some implementations of the present disclosure. In some implementations, the computer system 302 can be the computer system 1000 or include the computer system 1000. In some implementations, the computer system 302 can communicate with the computer system 1000.

The illustrated computer 1002 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 1002 can include a Smart Embedded Management Agent (SEMA), such as a built-in ADLINK SEMA 2.2, and a video sync technology, such as Quick Sync Video technology supported by ADLINK MSDK+. In some examples, the computer 1002 can include the MXE-5400 Series processor-based fanless embedded computer by ADLINK, though the computer 1002 can take other forms or include other components.

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus. In some implementations, any or all of the components of the computer 1002, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 1002 and other components (whether illustrated or not) that are communicably coupled to the computer 1002. The functionality of the computer 1002 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 1002, in alternative implementations, the API or the service layer can be standalone components in relation to other components of the computer 1002 and other components communicably coupled to the computer 1002. Moreover, any or all parts of the API or the service layer can be implemented as child or sub-modules of another software module, enterprise application, or hardware module without departing from the scope of the present disclosure.

The computer 1002 can include an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 can also include a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

An application can be an algorithmic software engine providing functionality according to particular needs, desires, or particular implementations of the computer 1002 and the described functionality. For example, an application can serve as one or more components, modules, or applications. Multiple applications can be implemented on the computer 1002. Each application can be internal or external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system including computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

Figure 11:
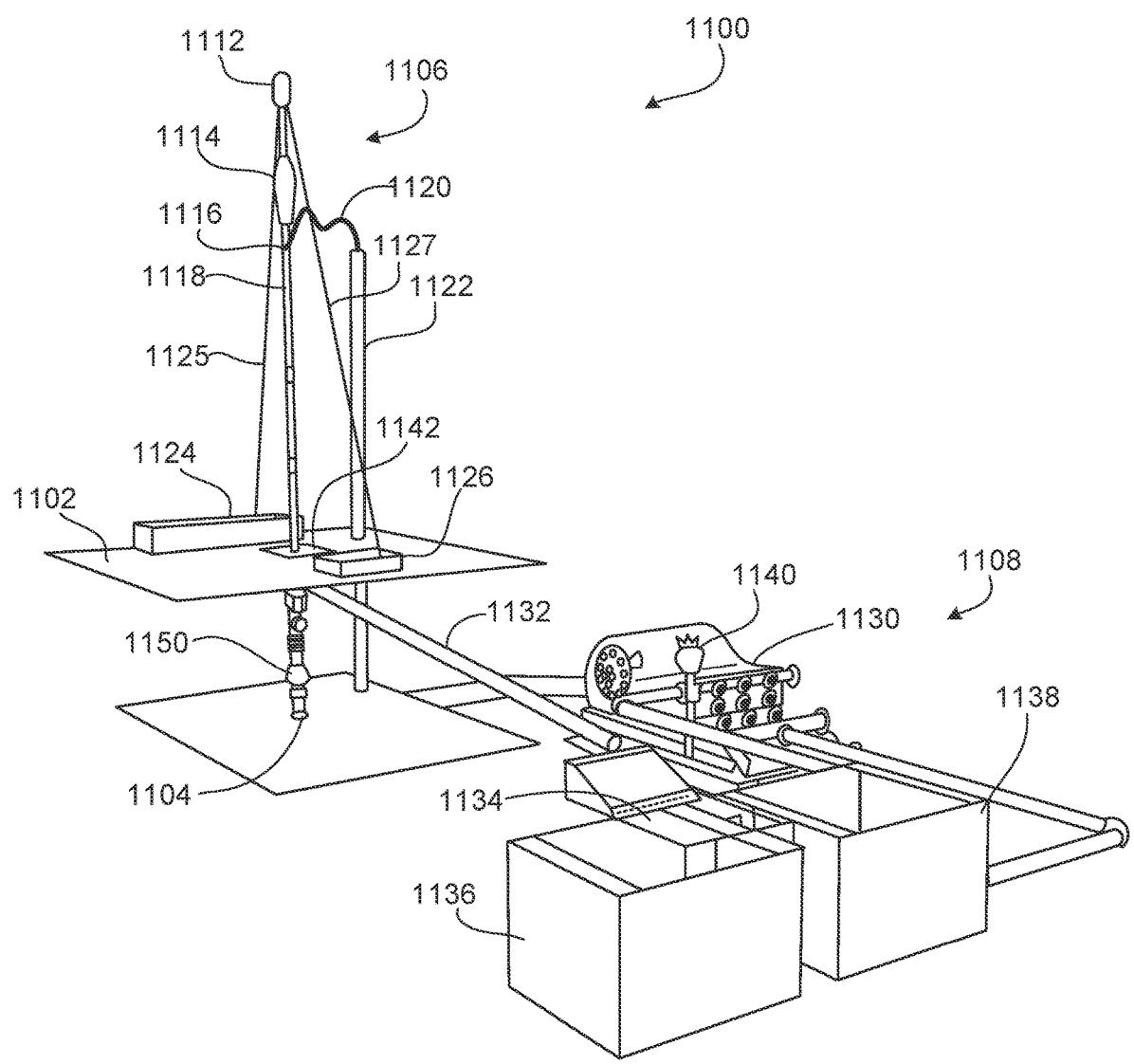
FIG. 11 is a partial schematic perspective view of an example rig system for drilling and producing a well, according to some implementations of the present disclosure.

FIG. 11 is a partial schematic perspective view of an example rig system 1100 for drilling and producing a well. The well can extend from the surface through the Earth to one or more subterranean zones of interest. The example rig system 1100 includes a drill floor 1102 positioned above the surface, a wellhead 1104, a drill string assembly 1106 supported by the rig structure, and a fluid circulation system 1108 to filter used drilling fluid from the wellbore and provide clean drilling fluid to the drill string assembly 1106. For example, the example rig system 1100 of FIG. 11 is shown as a drill rig capable of performing a drilling operation with the rig system 1100 supporting the drill string assembly 1106 over a wellbore. The wellhead 1104 can be used to support casing or other well components or equipment into the wellbore of the well.

The derrick or mast is a support framework mounted on the drill floor 1102 and positioned over the wellbore to support the components of the drill string assembly 1106 during drilling operations. A crown block 1112 forms a longitudinally-fixed top of the derrick, and connects to a travelling block 1114 with a drilling line including a set of wire ropes or cables. The crown block 1112 and the travelling block 1114 support the drill string assembly 1106 via a swivel 1116, a kelly 1118, or a top drive system (not shown). Longitudinal movement of the travelling block 1114 relative to the crown block 1112 of the drill string assembly 1106 acts to move the drill string assembly 1106 longitudinally upward and downward. The swivel 1116, connected to and hung by the travelling block 1114 and a rotary hook, allows free rotation of the drill string assembly 1106 and provides a connection to a kelly hose 1120, which is a hose that flows drilling fluid from a drilling fluid supply of the circulation system 1108 to the drill string assembly 1106. A standpipe 1122 mounted on the drill floor 1102 guides at least a portion of the kelly hose 1120 to a location proximate to the drill string assembly 1106. The kelly 1118 is a hexagonal device suspended from the swivel 1116 and connected to a longitudinal top of the drill string assembly 1106, and the kelly 1118 turns with the drill string assembly 1106 as the rotary table 1142 of the drill string assembly turns.

In the example rig system 1100 of FIG. 11, the drill string assembly 1106 is made up of drill pipes with a drill bit (not shown) at a longitudinally bottom end of the drill string. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 1106. In some implementations, the kelly 1118 and swivel 1116 can be replaced by a top drive that allows the drill string assembly 1106 to spin and drill. The wellhead assembly 1104 can also include a drawworks 1124 and a deadline anchor 1126, where the drawworks 1124 includes a winch that acts as a hoisting system to reel the drilling line in and out to raise and lower the drill string assembly 1106 by a fast line 1125. The deadline anchor 1126 fixes the drilling line opposite the drawworks 1124 by a deadline 1127, and can measure the suspended load (or hook load) on the rotary hook. The weight on bit (WOB) can be measured when the drill bit is at the bottom the wellbore. The wellhead assembly 1104 also includes a blowout preventer 1150 positioned at the surface of the well and below (but often connected to) the drill floor 1102. The blowout preventer 1150 acts to prevent well blowouts caused by formation fluid entering the wellbore, displacing drilling fluid, and flowing to the surface at a pressure greater than atmospheric pressure. The blowout preventer 1150 can close around (and in some instances, through) the drill string assembly 1106 and seal off the space between the drill string and the wellbore wall. The blowout preventer 1150 is described in more detail later.

During a drilling operation of the well, the circulation system 1108 circulates drilling fluid from the wellbore to the drill string assembly 1106, filters used drilling fluid from the wellbore, and provides clean drilling fluid to the drill string assembly 1106. The example circulation system 1108 includes a fluid pump 1130 that fluidly connects to and provides drilling fluid to drill string assembly 1106 via the kelly hose 1120 and the standpipe 1122. The circulation system 1108 also includes a flow-out line 1132, a shale shaker 1134, a settling pit 1136, and a suction pit 1138. In a drilling operation, the circulation system 1108 pumps drilling fluid from the surface, through the drill string assembly 1106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 1106 again. The drilling fluid returns in the annulus with rock cuttings and flows out to the flow-out line 1132, which connects to and provides the fluid to the shale shaker 1134. The flow line is an inclined pipe that directs the drilling fluid from the annulus to the shale shaker 1134. The shale shaker 1134 includes a mesh-like surface to separate the coarse rock cuttings from the drilling fluid, and finer rock cuttings and drilling fluid then go through the settling pit 1136 to the suction pit 1136. The circulation system 1108 includes a mud hopper 1140 into which materials (for example, to provide dispersion, rapid hydration, and uniform mixing) can be introduced to the circulation system 1108. The fluid pump 1130 cycles the drilling fluid up the standpipe 1122 through the swivel 1116 and back into the drill string assembly 1106 to go back into the well.

The example wellhead assembly 1104 can take a variety of forms and include a number of different components. For example, the wellhead assembly 1104 can include additional or different components than the example shown in FIG. 11. Similarly, the circulation system 1108 can include additional or different components than the example shown in FIG. 11.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

What is claimed is:

1. A non-transitory computer-readable medium storing one or more instructions executable by a computer system to perform operations comprising:
   receiving a density log and a compressional slowness log measured in a wellbore located in a formation;
   generating, based on the density log and the compressional slowness log, a reference compressional slowness log;
   determining, for an interval in the formation, a relationship between the compressional slowness log and the reference compressional slowness log;
   generating, based on the relationship and known pressure information in the interval, a pressure scale for the formation; and
   using the pressure scale to calculate pressure in the interval.

2. The non-transitory computer-readable medium of claim 1, wherein generating, based on the density log and the compressional slowness log, the reference compressional slowness log comprises:
   plotting the density log and the compressional slowness log on the same graph;
   creating a copy of the compressional slowness log; and
   shifting the copy of the compressional slowness log to overlap the density log, wherein the copy of the compressional slowness log is designated the reference compressional slowness log.

3. The non-transitory computer-readable medium of claim 1, wherein determining, for the interval in the formation, the relationship between the compressional slowness log and the reference compressional slowness log comprises:
   generating a cross plot of the compressional slowness log and the reference compressional slowness log for the interval, wherein the cross plot comprises values from the compressional slowness log and the reference compressional slowness log for the interval; and
   using linear regression to generate a linear best-fit line for the values, wherein the linear best-fit line defines the relationship between the relationship between the compressional slowness log and the reference compressional slowness log.

4. The non-transitory computer-readable medium of claim 1, wherein generating, based on the relationship and known pressure information from the interval, the pressure scale for the formation comprises:
   defining the pressure scale as:
   $$P = \alpha * \log(DT_{ref}) + \beta,$$
   wherein $\alpha$ and $\beta$ are derived based on the known pressure information.

5. The non-transitory computer-readable medium of claim 1, wherein generating, based on the relationship and known pressure information from the interval, the pressure scale for the formation comprises:
   plotting the known pressure information in a cross plot of reference compressional slowness and pore pressure; and
   generating, based on the relationship, a best-fit line for the plotted known pressure information, wherein the plotted best-fit line is the pressure scale.

6. The non-transitory computer-readable medium of claim 1, wherein the density log is a first density log, the compressional slowness log is a first compressional slowness log, the reference compressional slowness log is a first reference compressional slowness log, the interval is a first interval, the relationship is a first relationship, and the operations further comprising:
   generating, based on a second density log and a second compressional slowness log, a second reference compressional slowness log;
   determining, for a second interval in the formation, a second relationship between the second compressional slowness log and the second reference compressional slowness log; and
   calculating, using the pressure scale and the second relationship, pressure in the second interval.

7. The non-transitory computer-readable medium of claim 1, the operations further comprising:
   calculating, based on the pressure in the interval, a mud weight of a drilling system associated with the wellbore.

8. A system, comprising:
   one or more processors; and
   a non-transitory computer-readable storage medium coupled to the one or more processors and storing programming instructions for execution by the one or more processors, the programming instructions instructing the one or more processors to perform operations comprising:
      receiving a density log and a compressional slowness log measured in a wellbore located in a formation;
      generating, based on the density log and the compressional slowness log, a reference compressional slowness log;
      determining, for an interval in the formation, a relationship between the compressional slowness log and the reference compressional slowness log;
      generating, based on the relationship and known pressure information in the interval, a pressure scale for the formation; and
      using the pressure scale to calculate pressure in the interval.

9. The system of claim 8, wherein generating, based on the density log and the compressional slowness log, the reference compressional slowness log comprises:
   plotting the density log and the compressional slowness log on the same graph;
   creating a copy of the compressional slowness log; and
   shifting the copy of the compressional slowness log to overlap the density log, wherein the copy of the compressional slowness log is designated the reference compressional slowness log.

10. The system of claim 8, wherein determining, for the interval in the formation, the relationship between the compressional slowness log and the reference compressional slowness log comprises:

generating a cross plot of the compressional slowness log and the reference compressional slowness log for the interval, wherein the cross plot comprises values from the compressional slowness log and the reference compressional slowness log for the interval; and using linear regression to generate a linear best-fit line for the values, wherein the linear best-fit line defines the relationship between the relationship between the compressional slowness log and the reference compressional slowness log.

11. The system of claim 8, wherein generating, based on the relationship and known pressure information from the interval, the pressure scale for the formation comprises:

defining the pressure scale as:

$$P = \alpha * \log(DT_{ref}) + \beta,$$

wherein $\alpha$ and $\beta$ are derived based on the known pressure information.

12. The system of claim 8, wherein generating, based on the relationship and known pressure information from the interval, the pressure scale for the formation comprises:

plotting the known pressure information in a cross plot of reference compressional slowness and pore pressure; and generating, based on the relationship, a best-fit line for the plotted known pressure information, wherein the plotted best-fit line is the pressure scale.

13. The system of claim 8, wherein the density log is a first density log, the compressional slowness log is a first compressional slowness log, the reference compressional slowness log is a first reference compressional slowness log, the interval is a first interval, the relationship is a first relationship, and the operations further comprising:

generating, based on a second density log and a second compressional slowness log, a second reference compressional slowness log;

determining, for a second interval in the formation, a second relationship between the second compressional slowness log and the second reference compressional slowness log; and calculating, using the pressure scale and the second relationship, pressure in the second interval.

* * * * *